United States Patent [19]

Gwinn et al.

[11] 3,986,816

[45] Oct. 19, 1976

[54] IN-LINE DIE FASTENED TO BREAKER PLATE FOR SUPPORT

[75] Inventors: J. S. Gwinn, Bartlesville, Okla.;
George R. Hill, Houston, Tex.

[73] Assignee: Phillips Petroleum Company, Bartlesville, Okla.

[22] Filed: Sept. 11, 1974

[21] Appl. No.: 504,951

[52] U.S. Cl. .......................... 425/188; 425/192 R; 425/199; 425/380; 425/467; 425/311
[51] Int. Cl.² ............................................ B29F 3/06
[58] Field of Search .......... 425/188, 192, 197, 198, 425/199, 310, 380, 378, 379, 467; 259/193, 311

[56] References Cited
UNITED STATES PATENTS

| | | | |
|---|---|---|---|
| 1,876,256 | 9/1932 | Maynard | 425/380 X |
| 2,593,136 | 4/1952 | Gliss | 425/380 X |
| 2,821,745 | 2/1958 | Patton | 425/199 |
| 3,039,142 | 6/1962 | Zavasnik | 425/378 X |
| 3,393,427 | 7/1968 | Larsen | 425/380 X |
| 3,437,725 | 4/1969 | Pierce | 425/198 X |
| 3,584,355 | 6/1971 | Fischer | 425/199 |

FOREIGN PATENTS OR APPLICATIONS

| | | | |
|---|---|---|---|
| 521,092 | 1956 | Canada | 425/197 |
| 744,632 | 1933 | France | 425/197 |
| 572,356 | 1958 | Italy | 425/198 |
| 765,383 | 1957 | United Kingdom | 425/188 |

*Primary Examiner*—Robert D. Baldwin
*Assistant Examiner*—Mark Rosenbaum

[57] ABSTRACT

The rigidity of a die used in pelletizing plastics is increased by connecting the rear center of the die with a support fastened to the center of the breaker plate. The die body, support, and breaker plate are attached to the extruder in an in-line manner.

2 Claims, 3 Drawing Figures

IN-LINE DIE FASTENED TO BREAKER PLATE FOR SUPPORT

BACKGROUND OF THE INVENTION

This invention relates to an improved die assembly for an inline pelletizing extruder.

In the commercial production of polymeric materials, particularly normally solid resinous thermoplastic materials such as polyolefins and the like, the polymer is converted into pellets prior to being packaged and shipped to the fabricator.

These pellets may be produced by extruding strands of molten polymer which are cooled and thereafter cut into short sections. Preferably the strands are severed at the die by a rotating cutter and immediately contacted with water to cool same below the melting point before they touch so as to prevent agglomeration. This can be done by a dry die face cutter surrounded by a cylindrical housing whereby water is impinged on the freshly cut pellets as they swirl around the periphery of the housing. Alternatively the die itself can be in direct contact with the water. This, however, causes larger amounts of heat loss in the die itself which increases the pressure drop across the die. In any event, wherever a technique is used whereby a cutter severs the strands flush with the face of the die to form pellets, it is essential that the die not become warped as this will interfere with the cutting operation.

The problem of warpage of the die is of particular severity in pelletizing high molecular weight polymers such as ultra high molecular weight polyethylene and ultra high molecular weight ethylene copolymers because the high viscosity of the polymer melts generate high back pressures in the extruder barrel and breaker plate area, particularly during startups.

BRIEF SUMMARY OF THE INVENTION

It is an object of this invention to provide a rigid die assembly;

It is a further object of this invention to provide for the extrusion of high molecular weight polymers;

It is a further object of this invention to provide an improved in-line pelletizing extruder;

It is yet a further object of this invention to provide a die assembly which is susceptible to easy cleaning; and It is yet a further object of this invention to maintain a planar surface on a die face so as to facilitate a die face cutting operation.

In accordance with the invention, an in-line pelletizing die is connected to a breaker plate by means of a support connecting the center of the die with the center of the breaker plate.

BRIEF DESCRIPTION OF THE DRAWINGS

In the drawings, forming a part hereof, wherein like reference characters denote like parts in the various views.

DESCRIPTION OF THE PREFERRED EMBODIMENTS

The invention is of primary utility in the pelletizing of high molecular weight viscous materials particularly the material known in the art as ultra high molecular weight polyethylene or ultra high molecular weight ethylene copolymer. Preferred are polymers of at least one mono-1-olefin having 2 to 8 carbon atoms per molecule and having a molecular weight of greater than 250,000 as measured by solution viscosity-molecular weight relationships as developed by Tung. Generally these polymers have a melt index as determined by ASTM D 1238-62T, Cond. E of less than 0.01. Of course the invention can be used in the production of pellets from any extrudable thermoplastic material.

The invention is applicable to apparatus for producing pellets from any in-line extruder such as a dry die face cutter produced by Werner and Pfleiderer. In such a pelletizing unit, a plurality of strands is extruded generally in a circular pattern around a solid central portion of the die face and severed flush with the die face with a rotary cutting unit, generally a multi-bladed rotary knife. The cutting unit must rotate at a sufficient speed to force the freshly cut pellets out toward the periphery of a housing. Generally a rotor fitted with four or more knife blades is held against the die face and rotates at the speed of 700 to 3500 rpm. Of course some steam will be produced within the housing, but the term "dry die-face cutter" is meant to encompass units which are not submerged, but rather which throw the pellets radially or tangentially out against the cooling liquid. Preferably the invention is used with an in-line extruder having a die submerged in a cooling liquid such as water, the die face serving as at least a part of one wall of the water chamber. As with a dry die face cutter, at least one rotating blade cuts the strands flush with the die face.

The extruder can be any conventional single screw extruder or a multiple screw extruder or any other means capable of delivering plasticized polymer under high pressure to a die assembly. Frequently a twin screw rotary continuous mixer is used to feed hot melt to a single screw in-line extruder.

Figure 1:
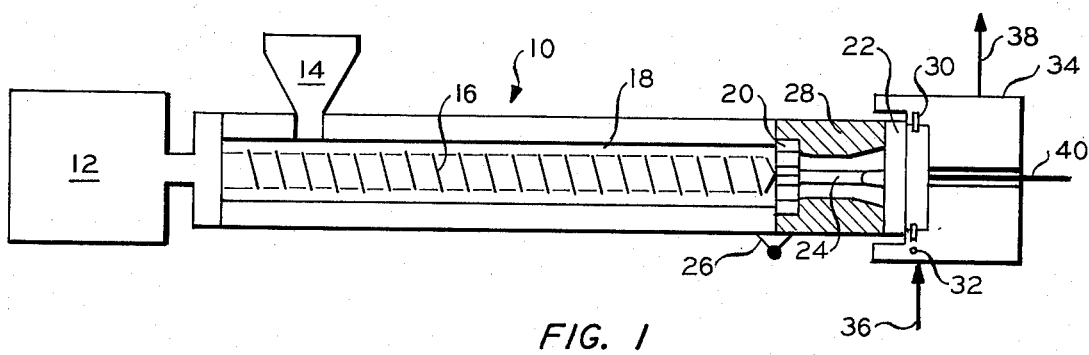
FIG. 1 is a schematic cross section of an extruder and pelletizer utilizing a die assembly in accordance with the invention.

Referring now to the drawings, particularly FIG. 1, is shown an in-line extruder 10 having a motor 12, a hopper 14 into which a feed supply of unplasticized granular polymer is introduced, and helical screw conveyor 16. At the downstream end of barrel 18 is adapter 28 which retains breaker plate 20. At the exit end of the adaptor is die 22 which is connected to the breaker plate by means of support 24. Preferably the entire die assembly is pivotally attached to the barrel of the extruder by means of hinge 26 so as to allow the entire pelletizing adaptor 28 carrying the breaker plate and die to be rotated downwardly so as to allow the breaker plate to be removed and polymer easily cleaned from the annulus between the support 24 and the adaptor 28. Alternatively, the entire die assembly (including the breaker plate, the die, and the pelletizing assembly) can be mounted on a track. This assembly can then be rolled axially away from the extruder to allow access to the breaker plate. In both cases attachment can be by hydraulic clamp. If the die 22 is held by means of a spider, it is more difficult to remove polymer in cleaning the assembly before introducing a different polymer. Strands of polymer are sheared flush with the face of die 22 by rotating blades 30. Housing 34 forms a water chamber with the die face being one wall of the chamber. Water is introduced via line 36 and removed via line 38. Shaft 40 serves as a means to rotate blades 30. Thus the pellets 32 are contacted with water prior to coming in contact with each other so as to quickly cool same. As noted hereinabove, the die assembly of this invention can be used with a dry die face cutter where the rotating blade forces the cut pellets radially outward against walls of a chamber as water is introduced tangentially to cool the pellets before they contact each other.

Figure 2:
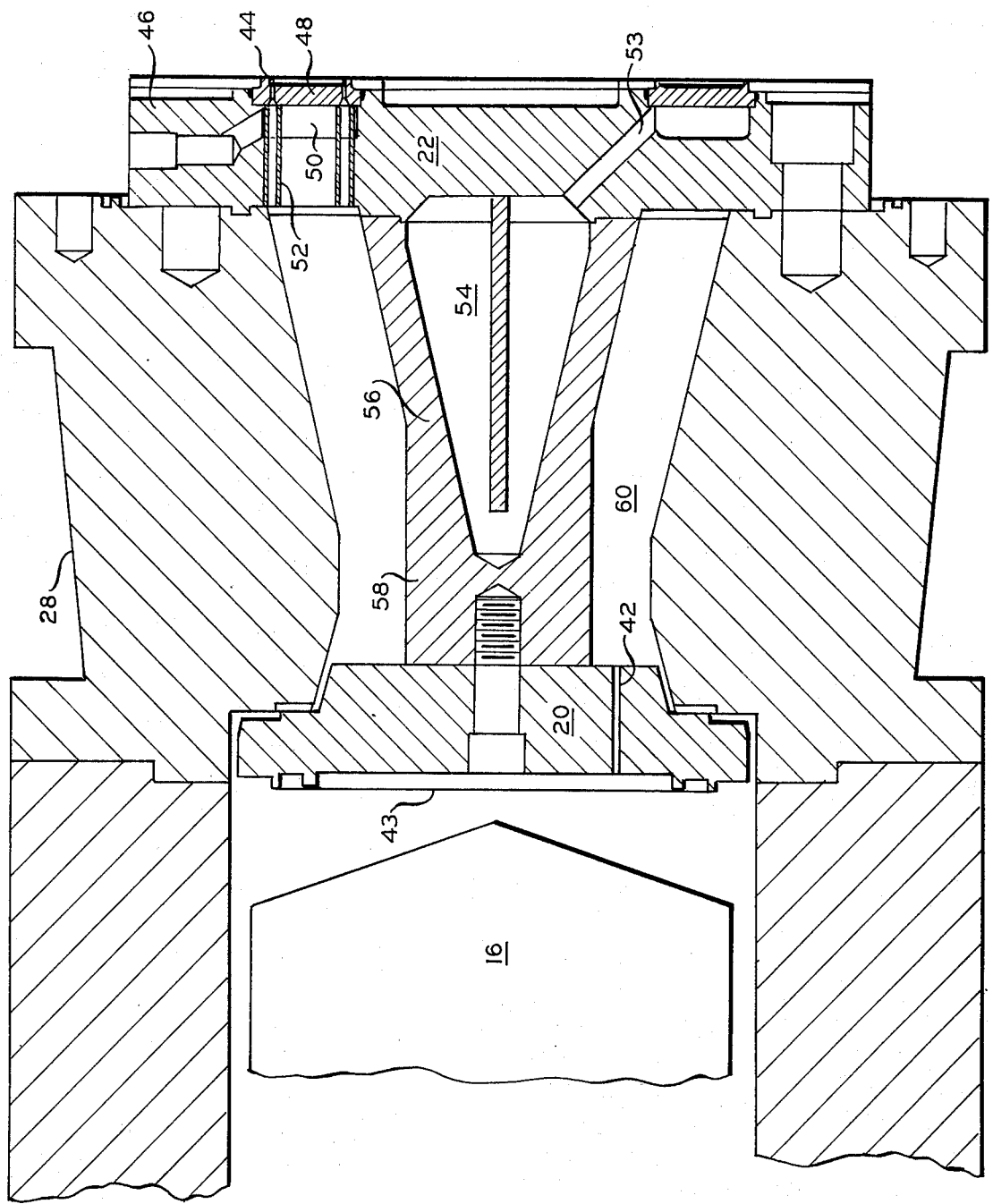
FIG. 2 is a cross section showing in detail the die and breaker plate assembly.

Referring now to FIG. 2, there is shown in detail adaptor 28 carrying the die assembly of the invention. As can be seen more fully in FIG. 3, breaker plate 20 has a large number of holes 42. Screen pack 43 between the end of screw 16 and breaker plate 20 catches foreign matter which may be present in the polymer melt. Die 22 has an annular ring of orifices 44. In the embodiment shown, the die is made up of a body section 46 and an annular die plate 48 with said die plate and body forming a cavity 50. Inserts 52 form the actual passageway for the polymer. The purpose of this is to allow a hot fluid such as steam or heated oil to pass in heat exchange relationship around said inserts to maintain the temperature of the polymer. Heated fluid can also be circulated by passage 53 to the interior 54 of the cone shaped member 56 which is attached to the central portion of die 22. Breaker plate 20 is connected to cone 56 by means of connecting member 58. It is also possible within the scope of the invention for member 58 to simply be a unitary solid member connecting plate 20 and die 22. Most preferably, however, the connecting member is hollow adjacent the die so as to allow circulation of heating fluid. Member 56 or in the instances where the entire unit is one piece, member 58, can be welded to die 22 as shown, or bolted thereto. Breaker plate 20 is removably attached to member 58 for instance by means of a plurality of bolts. As noted hereinabove this facilitates cleaning the polymer from annulus 60 between the outer surface of members 56 and 58 and the inner surface of adaptor 28. When the extrusion operation is shut down to change polymers, adaptor 28 which can be hinged as shown in FIG. 1 is rotated about said hinge, and the breaker plate unbolted from the connecting member 58. Alternatively the adaptor can be hydraulically clamped to the extruder. Breaker plate 20 and die 22 are, of course, also bolted to adaptor 28. Members 58 and/or 56 can be of the shape shown in the drawing or can be simply a unitary cylindrical structure as noted hereinabove. In addition, it is also possible to machine member 58 so that it corresponds in shape to the inner surface of adaptor 28 so that annulus 60 has a relatively constant crossectional area.

Figure 3:
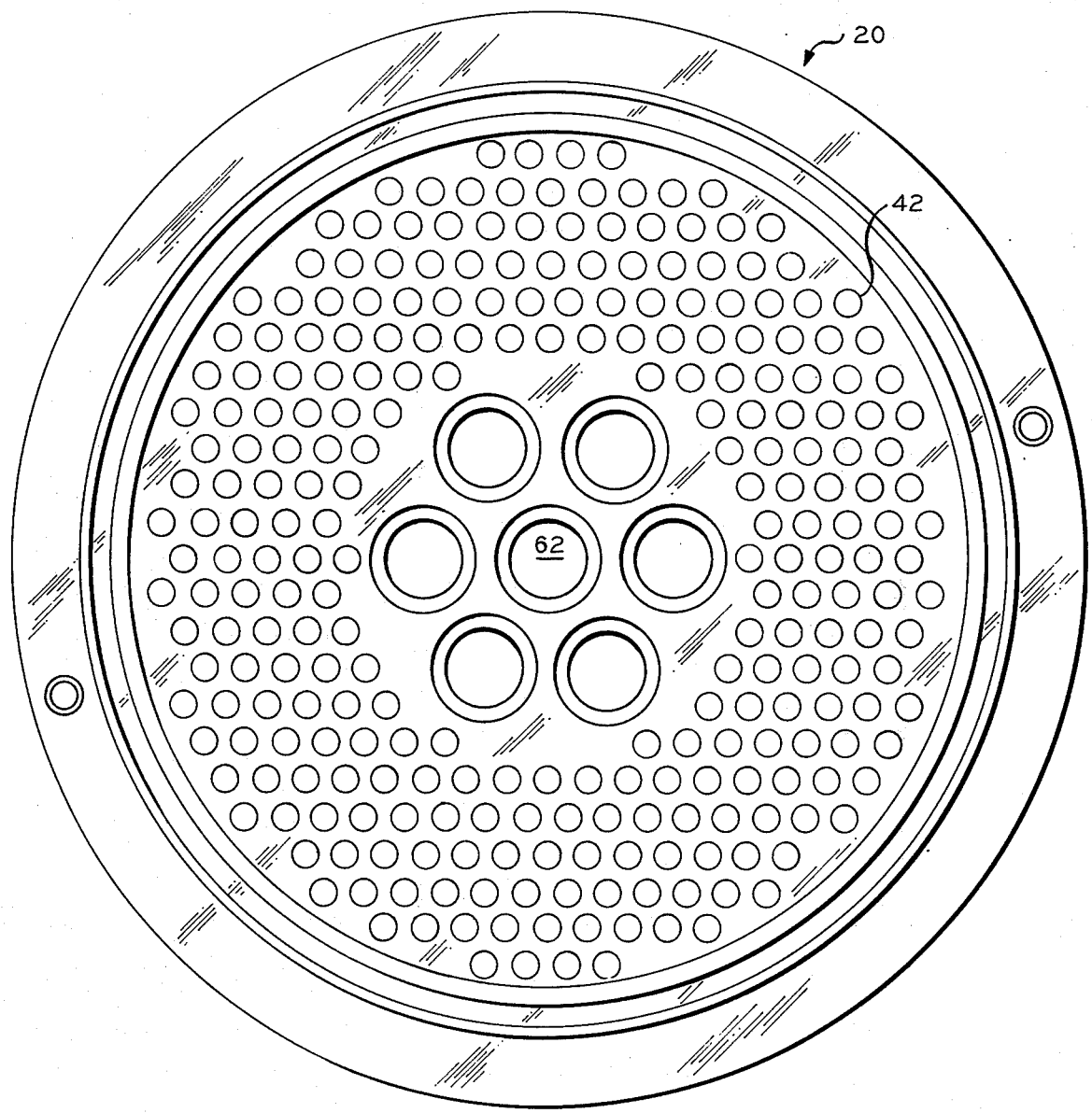
FIG. 3 is a view of the front of the breaker plate.

Referring now to FIG. 3, there is shown a front view of breaker plate 20 showing holes 42 and bolt holes 62. It is preferred that holes 42 have a diameter of greater than 19/64ths of an inch, preferably about 20/64ths of an inch to 30/64ths of an inch, most preferably about 25/64ths of an inch although the size of the holes can vary from these dimensions depending on the number of holes, the thickness of the breaker plate and the like. The holes represent, in the preferred embodiment, about 35–60, preferably 40–55 per cent of the surface area based on the surface area of the downstream face of the breaker plate. With the hole diameter as indicated hereinabove, a breaker plate having a thickness of 25–45, preferably 30–35 per cent of the diameter of said breaker plate (measured at the downstream end) is sufficient to provide the support necessary to maintain the die rigid and at the same time not create excessive back pressure at the breaker plate.

With large extruders (8 inch or greater diameter) the die thickness is somewhat limited to between 2.5 to 4 inches since excessive land lengths would otherwise occur. Hence the problem of die warpage with highly viscous polymer becomes progressively greater as the extruder diameter increases above 8 inches.

Many conventional parts such as heaters, motors, control means and the like have been eliminated for the sake of simplicity but their inclusion is understood by those skilled in the art and is within the scope of the invention.

EXAMPLE

An ethylene/butene copolymer, made in a slurry system, having a density of 0.955 g/cc (ASTM D 1505-67) and a melt flow (HLMI) of about 1.5 (ASTM D 1238-62T, Cond. F) compounded with about 2.5 weight per cent carbon black was plasticized in a Farrel twin rotor continuous mixer at about 410°–450° C. The thus plasticized material was then fed to a 10 inch 8/1 length/diameter Farrel hot melt single screw extruder having a die temperature of 500°–550° F and an underwater pelletizing die. Hot oil was circulated around inserts forming the orifices of the die and also within a cone shaped member connecting the die and a cylindrically-shaped member attached to the breaker plate. The die was connected to the breaker plate as shown in FIGS. 2 and 3. The extruder was run continuously for about 33 days at a high throughput rate with no problem of distortion or warpage of the die. The hourly rate varied from 3000 lbs/hour at the beginning of the run to 5000 lbs/hr at the end of the run. During startup the recorded pressure at the breaker plate was 3800 psi and 2550 psi at the die. When lined out the pressures were 3100 and 2100 psi, respectively. Thus the die can be used up to machine limiting pressures without die damage. The type of resin being extruded was changed and at this time the entire die and adaptor assembly was unclamped from the extruder and the breaker plate and screen pack removed. The polymer was removed from the annulus between the inner wall of the die adaptor and the outer surface of the member attached to the central portion of the die. The assembly was then put back together and new polymer extruded. It was found by the time the extrusion was lined out all traces of the former polymer were gone from the extrudate.

Control 1

Identical polymer was attempted to be extruded using an identical continuous mixer and single screw extruder except the die plate did not have the support connecting it with the breaker plate. The die failed during startup because it could not tolerate the high initial pressure, i.e. about 3800 psi at the breaker plate and about 2550 psi at the die.

Control 2

Identical polymer was extruded through an identical single screw extruder fed by an identical twin rotor continuous mixer except that the die plate was supported by a conventional spider attached to the adaptor. On changing polymer it was found that bits of previous polymers were trapped within the spider support and would slough off during extrusion of subsequent polymers. In particular, black char was found to slough off which could not be seen in black pellets but which caused pitting in finished pipe produced therefrom.

Some polymer melt is retained for long periods of time in the spider support area because of poor flow therethrough and it becomes degraded. This material, which may be discolored or black sloughs off and is of course objectionable. It is readily seen in uncolored resin. In pipe resin containing carbon black, the degraded resin bits cannot be seen but they cause pitting in pipe subsequently extruded from the pelleted resin.

While the invention has been described in detail for the purpose of illustration, it is not to be construed as limited thereby but is intended to cover all changes and modifications within the spirit and scope thereof.

What is claimed is:

1. A pelletizing apparatus comprising in combination:
    extruder means comprising a screw within a barrel to provide plasticized polymer melt to a die assembly;
    a breaker plate at an upstream end of said die assembly, said breaker plate having a screen pack at an upstream face thereof, said breaker plate having holes which represent 35 to 60 percent of the surface area based on a downstream face of said breaker plate;
    a die at a downstream end of said die assembly, said die assembly being attached by means of a hinge to said barrel of said extruder means so as to allow said die assembly to be rotated open so as to allow removal of said breaker plate, said die having a plurality of orifices in an annular configuration around said die;
    a connecting member attached to a central portion of said die and removably attached by bolt means to a central portion of said downstream face of said breaker plate;
    a rotary member having a plurality of blades adapted to sever extrudate from said orifices flush with a downstream face of said die;
    a chamber for holding cooling liquid, said downstream face of said die serving as at least a part of one wall of said chamber; and
    means to circulate a heat exchange medium around inserts forming said orifices in said die and also through said connecting member.

2. Apparatus according to claim 1 wherein said extruder means is a single screw extruder and wherein said holes in said breaker plate have a diameter within the range of 20/64 to 30/64 of a inch.

* * * * *